United States Patent
Chen et al.

(10) Patent No.: US 9,577,526 B2
(45) Date of Patent: Feb. 21, 2017

(54) VOLTAGE ADJUSTING APPARATUS WITH JUMPER

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Chun-Sheng Chen, New Taipei (TW); Wei Zhang, Wuhan (CN)

(73) Assignees: HON FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/605,234

(22) Filed: Jan. 26, 2015

(65) Prior Publication Data

US 2016/0172972 A1    Jun. 16, 2016

(30) Foreign Application Priority Data

Dec. 10, 2014    (CN) .......................... 2014 1 0751388

(51) Int. Cl.
*H02M 3/158*    (2006.01)
*H02M 1/00*    (2006.01)

(52) U.S. Cl.
CPC ..... *H02M 3/158* (2013.01); *H02M 2001/0006* (2013.01)

(58) Field of Classification Search
CPC ............................................ H02M 2001/0025
See application file for complete search history.

(56) References Cited

U.S. PATENT DOCUMENTS

| | | | |
|---|---|---|---|
| 6,441,597 B1 * | 8/2002 | Lethellier | H02M 3/158 323/222 |
| 6,480,071 B1 * | 11/2002 | Fujii | H03B 5/06 331/116 FE |
| H002069 H * | 7/2003 | Rieger | 331/1 A |
| 7,558,086 B2 * | 7/2009 | Cheng | H02M 1/08 315/287 |
| 7,701,690 B1 * | 4/2010 | Li | G05F 1/56 361/159 |

(Continued)

*Primary Examiner* — Timothy J Dole
*Assistant Examiner* — Yusef Ahmed
(74) *Attorney, Agent, or Firm* — Zhigang Ma

(57) ABSTRACT

A voltage adjusting apparatus includes a pulse width modulation (PWM) controller, a switch module, and a feedback module. The PWM controller outputs control signals. The switch module receives the control signals, and outputs working voltages accordingly. The feedback module includes a jumper, a first resistor, a second resistor, and a third resistor. If the first terminal and the second terminal of the jumper are electrically coupled together, the third resistor is cut off from the feedback module by the jumper, the first resistor and the second resistor are electrically coupled in the feedback module, and the switch module outputs a first working voltage accordingly. If the second terminal and the third terminal of the jumper are electrically coupled together, the first resistor, the second resistor, and the third resistor are all electrically coupled in the feedback module, the switch module outputs a second working voltage accordingly.

14 Claims, 2 Drawing Sheets

(56) References Cited

U.S. PATENT DOCUMENTS

| Patent/Pub. No. | Date | Inventor | Classification |
|---|---|---|---|
| 8,878,501 B2* | 11/2014 | Kalje | H02M 3/1584 323/272 |
| 9,178,428 B2* | 11/2015 | Tokai | H02M 3/1588 |
| 2005/0002134 A1* | 1/2005 | Ohtake | H02M 3/156 361/18 |
| 2005/0194951 A1* | 9/2005 | Mehas | H02M 1/36 323/282 |
| 2007/0108952 A1* | 5/2007 | Bartolo | H02M 3/157 323/282 |
| 2007/0194009 A1* | 8/2007 | Seger | H05B 1/0236 219/600 |
| 2007/0229149 A1* | 10/2007 | Pan | H02M 3/073 327/543 |
| 2008/0002440 A1* | 1/2008 | Cheng | H02M 1/08 363/21.02 |
| 2008/0164764 A1* | 7/2008 | So | H01R 13/7039 307/75 |
| 2008/0203982 A1* | 8/2008 | Chen | G06F 1/28 323/266 |
| 2008/0297957 A1* | 12/2008 | Mehas | H02M 1/32 361/18 |
| 2009/0085554 A1* | 4/2009 | Hu | G06F 1/26 323/353 |
| 2009/0102444 A1* | 4/2009 | Nonaka | H02M 3/156 323/282 |
| 2009/0162039 A1* | 6/2009 | Zou | G06F 1/206 388/811 |
| 2009/0167273 A1* | 7/2009 | Liu | H02M 3/1588 323/285 |
| 2009/0175602 A1* | 7/2009 | Qian | G06F 1/206 388/825 |
| 2009/0179625 A1* | 7/2009 | Liu | H02M 3/1588 323/285 |
| 2009/0224835 A1* | 9/2009 | Riedel | H03F 3/08 330/308 |
| 2009/0259859 A1* | 10/2009 | Zou | G06F 1/26 713/300 |
| 2009/0295424 A1* | 12/2009 | Guo | G09G 3/006 324/760.01 |
| 2010/0072963 A1* | 3/2010 | Wang | H02M 3/156 323/282 |
| 2010/0073835 A1* | 3/2010 | Jung | H02M 3/156 361/56 |
| 2010/0115336 A1* | 5/2010 | Shin | G06F 11/24 714/27 |
| 2010/0270995 A1* | 10/2010 | Laur | H02M 3/156 323/285 |
| 2011/0051463 A1* | 3/2011 | Chen | H02M 3/33507 363/19 |
| 2011/0115450 A1* | 5/2011 | Pongratananukul | H02M 1/36 323/271 |
| 2011/0225414 A1* | 9/2011 | Zhou | G06F 1/24 713/100 |
| 2012/0044096 A1* | 2/2012 | Huang | G06F 1/24 341/33 |
| 2012/0146599 A1* | 6/2012 | Oyama | H02M 3/1588 323/271 |
| 2012/0146605 A1* | 6/2012 | Oyama | H02M 3/156 323/282 |
| 2012/0194141 A1* | 8/2012 | Shi | H02J 7/0073 320/137 |
| 2013/0027134 A1* | 1/2013 | Zhu | H03F 3/45179 330/254 |
| 2013/0069633 A1* | 3/2013 | Tu | G01P 3/4805 324/163 |
| 2013/0151838 A1* | 6/2013 | Chen | G06F 1/24 713/100 |
| 2013/0162324 A1* | 6/2013 | Li | G01R 31/318572 327/405 |
| 2013/0262847 A1* | 10/2013 | Zou | G06F 9/441 713/2 |
| 2014/0126147 A1* | 5/2014 | Chen | G06F 1/206 361/695 |
| 2014/0175900 A1* | 6/2014 | Chen | G11B 5/012 307/112 |
| 2014/0176096 A1* | 6/2014 | Yamamoto | H02M 3/158 323/271 |
| 2014/0203791 A1* | 7/2014 | Lee | G05F 1/468 323/282 |
| 2014/0266095 A1* | 9/2014 | Tokai | H02M 3/1588 323/271 |
| 2014/0347027 A1* | 11/2014 | Jayaraj | H02M 3/1563 323/282 |
| 2015/0280473 A1* | 10/2015 | Zhao | H02J 7/0052 320/107 |

* cited by examiner

VOLTAGE ADJUSTING APPARATUS WITH JUMPER

CROSS-REFERENCE TO RELATED APPLICATIONS

This application claims priority to Chinese Patent Application No. 201410751388.9 filed on Dec. 10, 2014, the contents of which are incorporated by reference herein.

FIELD

The subject matter herein generally relates to a voltage adjusting apparatus.

BACKGROUND

Printed circuit boards (PCBs) usually have slots for inserting memory chips. Power supplies provided to the memory chips include 1.5 volts, 1.35 volts, and 1.25 volts DC voltages. A conventional PCB only provides a single DC voltage, which cannot meet the requirements when multiple memory chips are installed on the same PCB.

BRIEF DESCRIPTION OF THE DRAWINGS

Implementations of the present technology will now be described, by way of example only, with reference to the attached figures.

DETAILED DESCRIPTION

Figure 1:
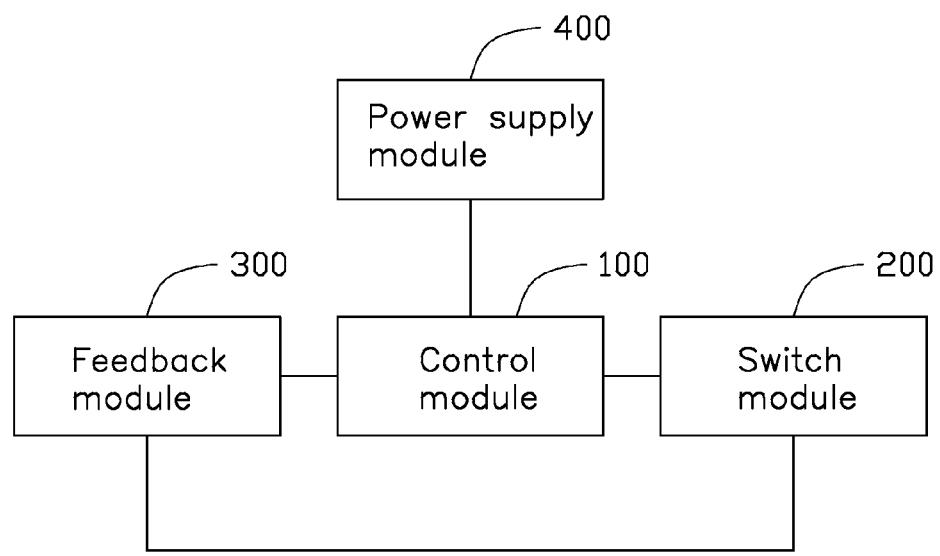
FIG. 1 is a block diagram of an embodiment of a voltage adjusting apparatus.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

FIG. 1 illustrates a voltage adjusting apparatus in accordance with one embodiment. The voltage adjusting apparatus includes a control module 100, a switch module 200, a feedback module 300, and a power supply module 400. The voltage adjusting apparatus is used to adjust a working voltage Vout that is provided to an electronic device (not shown). In at least one embodiment, the electronic device is a memory chip in a computer. The control module 100 is configured to output control signals to the switch module 200. The switch module 200 turns on or turns off according to the control signals and outputs the working voltage Vout to the electronic device. The feedback module 300 is configured to adjust the working voltage Vout that is provided to the electronic device. The power supply module 400 is configured to provide power supply for the control module 100.

Figure 2:
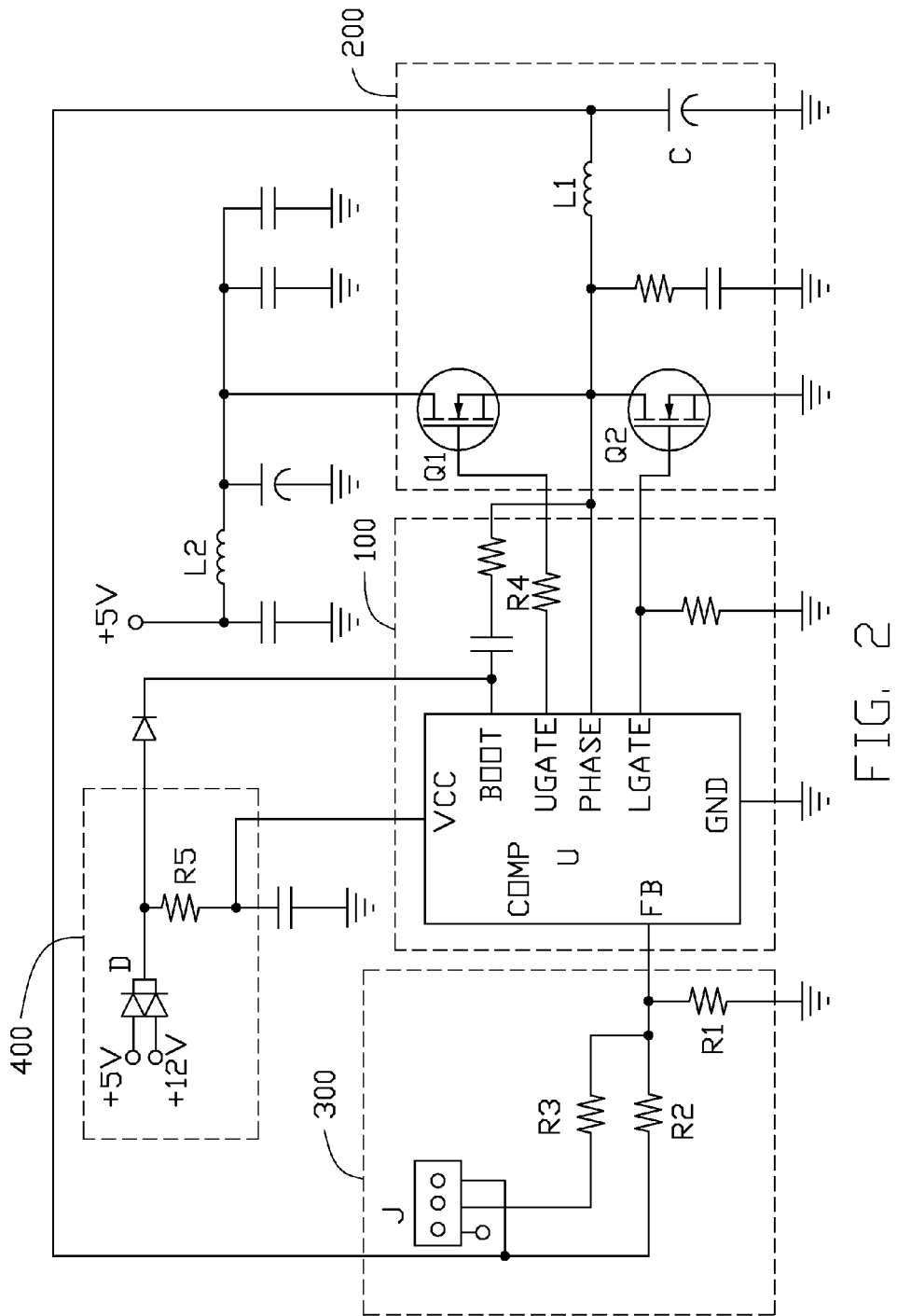
FIG. 2 is a circuit diagram of the voltage adjusting apparatus of FIG. 1.

FIG. 2 illustrates that the control module 100 includes a pulse width modulation (PWM) controller U. The PWM controller U includes a power terminal VCC, a ground terminal GND, a compensation terminal COMP, a feedback terminal FB, a booting terminal BOOT, a phase terminal PHASE, an upper gate driving terminal UGATE, and a lower gate driving terminal LGATE.

The switch module 200 includes a first switch Q1, a second switch Q2, a first inductor L1, and a capacitor C. Each of the first switch Q1 and the second switch Q2 includes a first terminal, a second terminal, and a third terminal. In at least one embodiment, the first switch Q1 and the second switch Q2 are n channel MOSFETs. The first terminal, the second terminal, and the third terminal are gate, source, and drain respectively.

The upper gate driving terminal UGATE is electrically coupled to the first terminal of the first switch Q1 via a fourth resistor R4. The phase terminal PHASE is electrically coupled to the second terminal of the first switch Q1. The third terminal of the first switch Q1 receives a first DC voltage via a second inductor L2. The lower gate driving terminal LGATE is electrically coupled to the first terminal of the second switch Q2. The second terminal of the second switch Q2 is grounded. The phase terminal PHASE is electrically coupled to the third terminal of the second switch Q2. A connection point between the second terminal of the first switch Q1 and the third terminal of the second switch Q2 is electrically coupled to a first terminal of the first inductor L1. A second terminal of the first inductor L1 is grounded via the capacitor C. In at least one embodiment, the first DC voltage is a +5 volts dual voltage.

The feedback module 300 includes a jumper J, a first resistor R1, a second resistor R2, and a third resistor R3. The jumper J includes a first terminal, a second terminal, and a third terminal. The feedback terminal FB is grounded via the first resistor R1. A connection point between the feedback terminal FB and the first resistor R1 is electrically coupled to a connection point between the first inductor L1 and the capacitor C via the second resistor R2. The connection point between the feedback terminal FB and the first resistor R1 is electrically coupled to the second terminal of the jumper J via the third resistor R3. The first terminal of the jumper J is idle. The third terminal of the jumper J is electrically coupled to the connection point between the first inductor L1 and the capacitor C.

The power supply module 400 includes a diode D. The diode D includes a first anode, a second anode, and a cathode. The power terminal VCC is electrically coupled to the cathode of the diode D via a fifth resistor R5. The first anode of the diode D receives the first DC voltage. The second anode of the diode D receives a second DC voltage. In at least one embodiment, the diode D is a Schottky barrier diode (SBD). The second DC voltage is a +12 volts system voltage.

In use, when the computer turns on, the +12 volts system voltage provides power supply to the PWM controller U via the diode D and the fifth resistor R5. When the computer turns off, the +5 volts dual voltage provides power supply to the PWM controller U via the diode D and the fifth resistor R5. The upper gate driving terminal UGATE and the lower gate driving terminal LGATE outputs high voltage level control signals alternately. The first switch Q1 and the second switch Q2 turn on and off according to the control signals. The feedback terminal FB outputs a constant feedback voltage Vfb.

When the upper gate driving terminal UGATE outputs the high voltage level control signal and the lower gate driving terminal LGATE outputs a low voltage level control signal, the first switch Q1 turns on, the second switch Q2 turns off. The +5 volts dual voltage is divided by the first switch Q1. The connection point between the first inductor L1 and the capacitor C outputs the working voltage Vout. The +5 volts dual voltage charges for the capacitor C via the first switch Q1 and the first inductor L1. In at least one embodiment, the feedback voltage Vfb is 0.8 volts.

When the upper gate driving terminal UGATE outputs the low voltage level control signal and the lower gate driving terminal LGATE outputs the high voltage level control signal, the first switch Q1 turns off, the second switch Q2 turns on. The connection point between the first inductor L1 and the capacitor C continues outputting the working voltage Vout as the voltage across the inductor L1 and the capacitor C cannot change quickly.

If the first terminal and the second terminal of the jumper J are electrically coupled together, the third resistor R3 is cut off from the feedback module 300 by the jumper J. The first resistor R1 and the second resistor R2 are electrically coupled in the feedback module 300. The working voltage Vout is calculated by the following formula: Vout=Vfb×(r1+r2)/r1.

If the second terminal and the third terminal of the jumper J are electrically coupled together, the first resistor R1, the second resistor R2, and the third resistor R3 are all electrically coupled in the feedback module 300. The working voltage Vout is calculated by the following formula: Vout=Vfb×(r1r2+r1r3+r2r3)/(r1r2+r1r3).

In the above formula, r1, r2, and r3 represent resistances of the first resistor R1, the second resistor R2, and the third resistor R3 respectively. In at least one embodiment, the resistances of the first resistor R1, the second resistor R2, and the third resistor R3 are 220 ohms, 200 ohms, and 680 ohms respectively. According to the above formula, the working voltage Vout is 1.5 volts if the first terminal and the second terminal of the jumper J are electrically coupled together, and the working voltage Vout is 1.36 volts if the second terminal and the third terminal of the jumper J are electrically coupled together.

The embodiments shown and described above are only examples. Many details are often found in the art such as the other features of a voltage adjusting apparatus. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A voltage adjusting apparatus comprising:
   a feedback module comprising a jumper, a first resistor, a second resistor, and a third resistor;
   a control module comprising a pulse width modulation (PWM) controller configured to output control signals, the PWM controller comprising a feedback terminal, an upper gate driving terminal, a lower gate driving terminal, and a phase terminal;
   a connection point being located between the feedback terminal and the first resistor;
   a switch module configured to receive the control signals, and output working voltages accordingly and being electrically coupled to the connection point via the second resistor; and
   a diode, a fourth resistor, and a second inductor;
   the connection point being further electrically coupled to a second terminal of the jumper via the third resistor; a first terminal of the jumper is idle;
   a third terminal of the jumper is electrically coupled to the switch module;
   wherein if the first terminal and the second terminal of the jumper are electrically coupled together, the third resistor is cut off from the feedback module by the jumper, the first resistor and the second resistor are electrically coupled in the feedback module, the switch module outputs a first working voltage accordingly; and
   wherein if the second terminal and the third terminal of the jumper are electrically coupled together, the first resistor, the second resistor, and the third resistor are all electrically coupled in the feedback module, the switch module outputs a second working voltage accordingly; the switch module comprises a first switch, a second switch, a first inductor, and a capacitor, each of the second switch and the first switch comprises a first terminal, a second terminal, and a third terminal; the upper gate driving terminal is electrically coupled to the first terminal of the first switch; the second terminal of the first switch is electrically coupled to the third terminal of the second switch; the third terminal of the first switch receives a first DC voltage; and the phase terminal is electrically coupled to the second terminal of the first switch;
   the lower gate driving terminal is electrically coupled to the first terminal of the second switch; the second terminal of the second switch is grounded; a connection point between the second terminal of the first switch and the third terminal of the second switch is electrically coupled to a first terminal of the first inductor; a second terminal of the first inductor is grounded via the capacitor; a connection point between the first inductor and the capacitor is electrically coupled to a connection point between the feedback terminal and the first resistor via the second resistor; and the connection point between the first inductor and the capacitor is electrically coupled to the third terminal of the jumper;
   the diode comprises a first anode, a second anode, and a cathode; the PWM controller further comprises a power terminal; the power terminal is electrically coupled to the cathode of the diode via a fifth resistor; the first anode of the diode receives the first DC voltage; and the second anode of the diode receives a second DC voltage;

the upper gate driving terminal is electrically coupled to the first terminal of the first switch via the fourth resistor; and the third terminal of the first switch receives the first DC voltage via the second inductor.

2. The voltage adjusting apparatus of claim 1, wherein the first switch and the second switch are n channel MOSFETs; and the first terminal, the second terminal, and the third terminal are gate, source, and drain respectively.

3. The voltage adjusting apparatus of claim 1, wherein the first DC voltage is a +5 volts dual voltage.

4. The voltage adjusting apparatus of claim 1, wherein the second DC voltage is a +12 volts system voltage.

5. The voltage adjusting apparatus of claim 4, further comprising an electronic device configured to receive the working voltages; when the electronic device turns on, the +12 volts system voltage provides power supply to the PWM controller via the diode and the fifth resistor; and when the electronic device turns off, the +5 volts dual voltage provides power supply to the PWM controller via the diode and the fifth resistor.

6. The voltage adjusting apparatus of claim 4, wherein when the upper gate driving terminal outputs a high voltage level control signal and the lower gate driving terminal outputs a low voltage level control signal, the first switch turns on, the second switch turns off, the +5 volts dual voltage is divided by the first switch, the connection point between the first inductor and the capacitor outputs the working voltages; and the +5 volts dual voltage charges for the capacitor via the first switch and the first inductor.

7. The voltage adjusting apparatus of claim 4, wherein when the upper gate driving terminal outputs the low voltage level control signal and the lower gate driving terminal outputs the high voltage level control signal, the first switch turns off, the second switch turns on, the connection point between the first inductor and the capacitor continues outputting the working voltages as the voltage across the inductor and the capacitor cannot change quickly.

8. A voltage adjusting apparatus comprising:
a control module comprising a pulse width modulation (PWM) controller configured to output control signals, the PWM controller comprises an upper gate driving terminal, a lower gate driving terminal, and a phase terminal;
a switch module configured to receive the control signals, and output working voltages accordingly;
a feedback module comprising a jumper, a first resistor, a second resistor, and a third resistor; and
a diode, a fourth resistor, and a second inductor;
wherein the switch module comprises a first switch, a second switch, a first inductor, and a capacitor, each of the second switch and the first switch comprises a first terminal, a second terminal, and a third terminal; the upper gate driving terminal is electrically coupled to the first terminal of the first switch; the second terminal of the first switch is electrically coupled to the third terminal of the second switch; the third terminal of the first switch receives a first DC voltage; and the phase terminal is electrically coupled to the second terminal of the first switch;
if the first terminal and the second terminal of the jumper are electrically coupled together, the third resistor is cut off from the feedback module by the jumper, the first resistor and the second resistor are electrically coupled in the feedback module, the switch module outputs a first working voltage accordingly; and if the second terminal and the third terminal of the jumper are electrically coupled together, the first resistor, the second resistor, and the third resistor are all electrically coupled in the feedback module, the switch module outputs a second working voltage accordingly;
the second terminal of the second switch is grounded; a connection point between the second terminal of the first switch and the third terminal of the second switch is electrically coupled to a first terminal of the first inductor; a second terminal of the first inductor is grounded via the capacitor; the feedback terminal is grounded via the first resistor; a connection point between the feedback terminal and the first resistor is electrically coupled to a connection point between the first inductor and the capacitor via the second resistor; the connection point between the feedback terminal and the first resistor is electrically coupled to the second terminal of the jumper via the third resistor; the first terminal of the jumper is idle; and the third terminal of the jumper is electrically coupled to the connection point between the first inductor and the capacitor;
the diode comprises a first anode, a second anode, and a cathode; the PWM controller further comprises a power terminal; the power terminal is electrically coupled to the cathode of the diode via a fifth resistor; the first anode of the diode receives the first DC voltage; and the second anode of the diode receives a second DC voltage;
the upper gate driving terminal is electrically coupled to the first terminal of the first switch via the fourth resistor; and the third terminal of the first switch receives the first DC voltage via the second inductor.

9. The voltage adjusting apparatus of claim 8, wherein the first switch and the second switch are n channel MOSFETs; and the first terminal, the second terminal, and the third terminal are gate, source, and drain respectively.

10. The voltage adjusting apparatus of claim 8, wherein the first DC voltage is a +5 volts dual voltage.

11. The voltage adjusting apparatus of claim 8, wherein the second DC voltage is a +12 volts system voltage.

12. The voltage adjusting apparatus of claim 11, further comprising an electronic device configured to receive the working voltages; when the electronic device turns on, the +12 volts system voltage provides power supply to the PWM controller via the diode and the fifth resistor; and when the electronic device turns off, the +5 volts dual voltage provides power supply to the PWM controller via the diode and the fifth resistor.

13. The voltage adjusting apparatus of claim 11, wherein when the upper gate driving terminal outputs a high voltage level control signal and the lower gate driving terminal outputs a low voltage level control signal, the first switch turns on, the second switch turns off, the +5 volts dual voltage is divided by the first switch, the connection point between the first inductor and the capacitor outputs the working voltages; and the +5 volts dual voltage charges for the capacitor via the first switch and the first inductor.

14. The voltage adjusting apparatus of claim 11, wherein when the upper gate driving terminal outputs the low voltage level control signal and the lower gate driving terminal outputs the high voltage level control signal, the first switch turns off, the second switch turns on, the connection point between the first inductor and the capacitor continues outputting the working voltages as the voltage across the inductor and the capacitor cannot change quickly.

* * * * *